United States Patent

Ritsema

[15] 3,653,630

[45] Apr. 4, 1972

[54] SOLENOID VALVE WITH PLURAL SPRINGS

[72] Inventor: Irving R. Ritsema, South Bend, Ind.

[73] Assignee: The Bendix Corporation

[22] Filed: July 15, 1970

[21] Appl. No.: 54,965

[52] U.S. Cl............................................251/129, 251/141
[51] Int. Cl.............................................F16k 31/06
[58] Field of Search.........................................251/129, 141

[56] References Cited

UNITED STATES PATENTS

| | | | |
|---|---|---|---|
| 3,484,076 | 12/1969 | Naumann | 251/141 |
| 1,323,778 | 12/1919 | Lemp | 251/141 X |
| 2,735,047 | 2/1956 | Garner et al. | 251/129 X |
| 2,631,612 | 3/1953 | Buescher | 251/141 X |
| 3,133,234 | 5/1964 | Dietz | 251/141 X |

Primary Examiner—Arnold Rosenthal
Attorney—William N. Antonis and Plante, Hartz, Smith and Thompson

[57] ABSTRACT

A solenoid valve having particular utility in adaptive braking systems on automotive vehicles, in which the armature is provided with a conventional coil spring urging it toward its released position. A supplementary spring in the form of a bowed or wave washer whose free height is less than the total air gap of the valve also acts as an anti-residual magnetism shim. The supplementary spring makes it possible to minimize closing and opening times of the valve.

2 Claims, 5 Drawing Figures

PATENTED APR 4 1972

3,653,630

INVENTOR.
IRVING R. RITSEMA

BY Plante, Hartz, Smith & Thompson
ATTORNEYS 3,653,630

SOLENOID VALVE WITH PLURAL SPRINGS

DESCRIPTION OF THE PRIOR ART

In adaptive braking systems on automotive vehicles, modulation of brake pressures is accomplished by mechanisms controlled by solenoid valves, and the effectiveness of the adaptive braking system is, in a large degree, influenced by the response characteristics of these valves. In most systems it is essential that opening and closing times of the valves be approximately equal and of very low magnitude. A desired response time would be 0, but a practical response time for effective operation of the adaptive braking system is 3 to 5 milliseconds. The solution of the problem of designing solenoid valves for these systems would be easier if it were possible to apply unlimited electrical power to the coils of the valves. However, the electrical control elements of typical automotive adaptive braking systems usually include transistors and related electronic components, and, for reasons of practical economy, the power which they can transmit to the valves is limited to a range of 2 to 3 amperes at about 9 to 15 volts. The valves also must have large orifice areas to provide correspondingly large flow rates, further compounding the difficulty of meeting design objectives, since this results in correspondingly large operating forces being required to open or close the valves.

SUMMARY OF THE INVENTION

Therefore, it is an object of this invention to provide a solenoid valve for use in an adaptive braking system, in which the valve incorporates means for equalizing the opening and closing times of the valve.

It is also an object of this invention to provide a solenoid valve in which the opening and closing times are minimized.

It is a further object to provide a solenoid valve having supplementary spring means whereby the opening and closing times of the valve can be both equalized and kept to a minimum.

It is a still further object of the invention to provide a solenoid valve in which the preload of the conventional armature return spring may be held to a minimum to minimize the opening time of the valve, while a supplementary spring whose travel is less than the stroke of the valve armature, provides an initial closing impulse to minimize the closing time.

Yet another object is to provide a solenoid valve in which the above referred-to supplementary spring also serves the additional purpose of an anti-residual magnetism shim.

To accomplish these and other objects, the conventional anti-residual shim of soft brass is replaced by a spring washer made from tempered sheet material such as hard brass, phosphor bronze or beryllium copper. The spring washer may take many shapes from a simple bowed washer to a multiple convolution wave washer, depending upon the properties of the material which is used and the desired spring rate and compressed load. In most cases, the free height of this supplementary spring must be less than the total air gap between the valve armature and the pole piece so that it exerts no force on the armature when the valve is on its seat, and therefore, does not affect the forces required for initial opening movement. These forces, which include the preload of a conventional coil type return spring and the product of the pressure difference across the valve times the area of the valve seat, are definitive of the opening time of the valve and may be adjusted separately to meet design requirements. The forces exerted by the conventional coil spring, pressure drop due to flow through the open valve, and the supplementary spring are definitive of the closing time of the valve. In accordance with the invention, the closing time can be adjusted separately, with negligible effect on opening time, by appropriate variation of the characteristics of the supplementary spring.

DETAILED DESCRIPTION OF THE INVENTION

Figures 1, 2, 3, 4, 5:
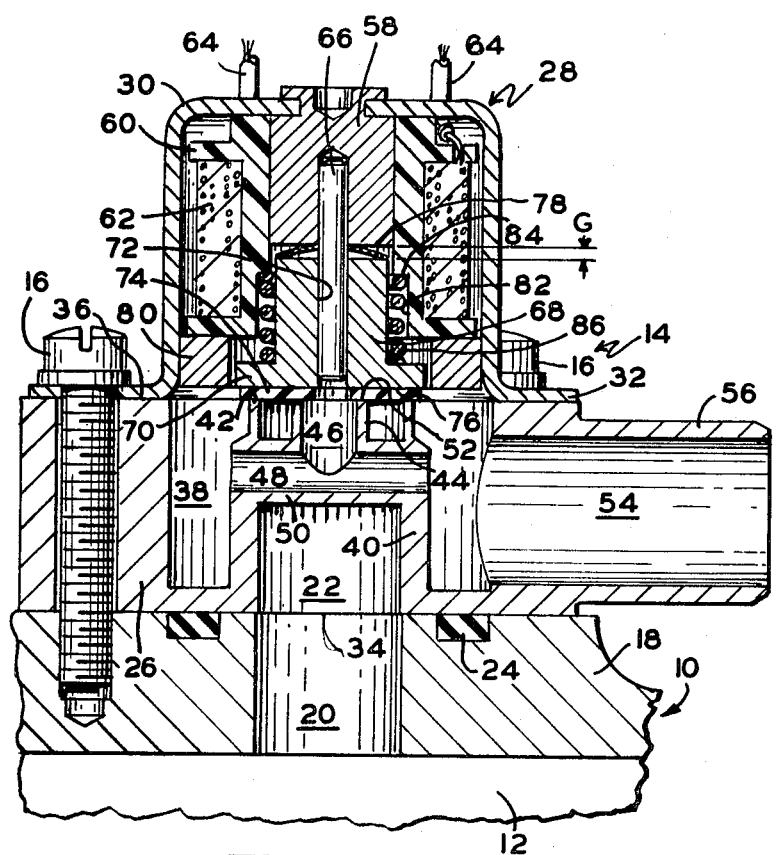
FIG. 1 is a longitudinal sectional view of a valve made in accordance with the invention.
FIG. 2 is a plan view of a supplementary spring washer of bowed configuration as shown in FIG. 1.
FIG. 3 is a sectional view of of the spring washer of FIG. 2 along line 3—3.
FIG. 4 is a plan view of a supplementary spring washer of an alternate configuration.
FIG. 5 is a side view of the spring washer of FIG. 4.

Referring to FIG. 1 of the drawings, there is shown a housing 10 which may be the housing of a vacuum or air powered brake pressure modulator for use in an adaptive braking system on an automotive vehicle. The housing 10 may enclose a chamber 12 containing a diaphragm or piston (not shown) the movement of which is to be controlled by a solenoid valve. The solenoid valve, designated generally by the numeral 14 is mounted by means of capscrews 16 on a boss 18 of the housing 10. The boss 18 is formed with an air inlet passage 20 communicating with an air outlet passage 22 of the valve 14. The joint between the two passages is sealed by a seal 24.

The valve 14 comprises a body 26, which is preferably fabricated as a diecasting, and a coil assembly, designated generally by the numeral 28. The coil assembly 28 is contained in a coil housing 30 which is formed as a cup-shaped steel stamping having a mounting flange 32. The body 26 is formed with parallel flat surfaces 34 and 36. The lower of these surfaces 34, rests on the boss 18 and is formed with the air outlet passage 22 which extends through the body 26 to the upper surface 36. The upper surface 36 receives the mounting flange 32 of the coil housing 30 and is formed with a cylindrical air chamber 38 which extends downward into the body casting 26 in annular relationship to the air outlet passage 22. A cylindrical wall 40, which is formed between the chamber 38 and the outlet passage 22, terminates flush with the upper surface 36 to provide a fixed valve element in the form of an annular valve seat 42. The outlet passage 22 has formed in its upper end an inner annulus 44 surrounding a secondary air chamber 46. The secondary air chamber 46 communicates with the air chamber 38 by a cross passage 48 of which the tubular walls 50 support the inner annulus 44. The inner annulus 44 also terminates flush with the surface 36 to form a secondary valve seat 52 located generally concentrically to the valve seat 42. An air inlet passage 54 extends radially through a side wall of the body 26 and through a boss 56 formed on the side of the body 26. The boss 56 may be connected to a source of air pressure by a conduit (not shown), or in the case of vacuum operation, may be attached to an air filter (not shown).

A cylindrical pole piece 58 is riveted to the top of the coil housing 30 and is generally concentric to the valve seat 42. A molded plastic coil bobbin 60, upon which a coil 62 is wound, is disposed annularly of the pole piece 58. Electrical leads 64 connected to the coil 62 provide for connection to a control system (not shown). A guide pin 66 of brass, aluminum, or stainless steel is pressed into a hole drilled centrally in the inner end of the pole piece 58 and extends nearly to the valve seat 42. A generally cylindrical armature 68 with a circular flange 70 formed near its lower end has a central drilled opening 72 by means of which the armature 68 is slidably mounted upon the guide pin 66. A disc 74 of resilient elastomeric material is cemented or otherwise secured to the flat bottom surface 76 of the flange 70 to form a movable valve element to cooperate with the fixed seat elements 42 and 52.

The adjacent ends of the pole piece 58 and the armature 68 are flat and parallel and, when the movable valve element 74 is on the valve seats 42 and 52, a predetermined initial air gap G exists between the said ends. In conventional solenoid valves it is customary to interpose an anti-residual magnetism shim of soft brass between the ends of the pole piece 58 and the armature 68. It was learned many years ago that a very slight remanence in the magnetic path of a solenoid would maintain a high flux when the air gap is zero, thereby causing the armature to hang up. The anti-residual shim insured that a predetermined minimum air gap always existed. As a feature of the present invention, the anti-residual shim is replaced by a spring-tempered deformed washer 78 of non-magnetic sheet material such as phosphor bronze, beryllium copper or stainless steel. In the valve illustrated in FIG. 1, the washer 78 is of simple bowed configuration as shown in FIGS. 2 and 3. It is another feature of the invention that the free height of the spring washer 78, indicated by the letter H in FIG. 3, is less than the air gap G. The An iron washer 80 is pressed into the coil housing 30 adjacent to the flange 70 of the armature 68. The washer 80 serves to retain the coil bobbin 60 in place and to complete the magnetic circuit of the solenoid 28. In order to reduce friction and binding, a positive minimum clearance is maintained between the washer 80 and the armature 68 so that guidance and alignment of the armature is accomplished solely by the guide pin 66. The coil bobbin 60 has an enlarged central bore 82 at its lower end terminating in a shoulder 84. A coil spring 86, serving as return spring, is disposed in the cavity formed by the bore enlargement 82. The ends of the coil spring 86 bear against the shoulder 84 and the upper surface of the flange 70. The spring 86 is designed to exert a predetermined preload force on the armature 68 when the valve element 74 is on the valve seats 42 and 52.

In FIGS. 4 and 5 an alternative form of spring washer, designated by reference numeral 178, is illustrated. This washer is formed with several convolutions. A spring washer of this configuration, commonly known as a wave washer, may permit larger forces to be exerted during the initial movement of the armature 68 towards the valve closed position, or alternatively, may permit H to be reduced so that a smaller initial air gap G can be utilized. For equal forces the washer material thickness may be reduced if it remains sufficient to perform the anti-residual magnetism function, and thereby permit some reduction in total air gap. A reduction in total air gap might be desirable in order to permit a valve to be designed with a larger port or valve seat area or to permit the valve to be used with a greater maximum pressure difference between inlet and outlet.

OPERATION OF THE INVENTION

The solenoid valve 14 illustrated in the figures is a normally closed valve. It is conceivable that features of the invention are applicable to other types of valves, such as a normally open valve, but it was not thought necessary to illustrate such a valve in detail. When the coil 62 is not energized, the return spring 86 urges the armature away from the pole piece 58 bringing the valve element 74 into contact with the valve seats 42 and 52. The higher pressure in the inlet passage 54 is thereby prevented from communicating to the valve outlet passage 20 of the controlled device (not completely illustrated) which we have assumed to be an adaptive braking system pressure modulator. It is obvious that the full pressure difference exists across the valve seats 42 and 52, and therefore, a force additional to that of the return spring 86 is exerted on the armature 68 holding the valve disc 74 in contact with the seats. This force is equal to the product of the pressure difference times the total area of the valve seats. It should be noted that this area is the difference between the area of a circle of diameter equal to the diameter of the larger seat 42 minus the area of a circle of diameter equal to the diameter of the inner or secondary valve seat 42. Under these conditions the separation of the armature 68 and pole piece 58 will be equal to G. Since it has been specifically stated that the free height H of the spring washer 78 is less than G, the spring washer will not be exerting any force on the armature 68.

When it is desired to admit pressure to, or increase pressure in, the chamber 12, the coil 62 may be energized by application of a voltage across its terminals through the leads 64. Since this is an inductive circuit, current will build up in accordance with a well known mathematical expression, and at the same time a magnetic field will be established which will grow in strength as a function of the increase in current. The magnetic flux will follow the low reluctance path provided by the coil housing 30, the iron washer 80, the armature 68 with its flange 70, and the pole piece 58. The flux passing across the radial air gap between the iron washer 80 and the armature flange 70 exerts lateral forces on the armature. Due to the centralizing and guiding effect of the guide pin 66, these forces are essentially balanced and do not materially affect valve performance. The flux passing across the air gap G between the pole piece 58 and the armature 68 exerts an increasing force tending to lift the armature. When this force equals the forces of the spring 86 and the pressure difference, the armature 68 moves toward the pole piece 58, lifting the valve element 74 from the valve seats 42 and 52. As the armature 68 moves, the air gap is reduced. Since the initial air gap G constituted the major part of the total reluctance of the magnetic circuit, the reduction in air gap results in a proportionate increase in magnetic flux. The force exerted between the pole piece 58 and the armature 68 increases in proportion to the square of the flux. Thus, the armature 68 is subjected to a rapidly increasing free force which accelerates it rapidly toward the pole piece 58. As the armature 68 moves toward the pole piece 58, it contacts the spring washer and flattens it. It is well known in the art that bowed spring washers and wave washers such as 78 and 178 are very high rate springs. Therefore, by the time the washer 78 is completely flattened, a very large spring force is exerted on the armature 68. At the same time the armature has been prevented from coming into actual contact with the pole piece by a distance at least equal to the thickness of the material of the spring washer 78. Thus, the supplementary spring washer 78 performs the function of an ordinary anti-residual shim. Due to the fact, as previously described, of the increasing force characteristics of solenoids as air gaps are reduced, there is almost no effect on the total opening time of the valve as a result of the force of the supplementary spring 78. In actual practice, valves can be made to start opening in 0.002 to 0.0025 seconds and complete opening in another .0005 to 0.0008 seconds.

When the control system senses that no further increase of pressure in the chamber 12 is needed, the voltage applied to the coil 62 is terminated and the magnetic field begins to collapse in accordance with the well known mathematical expression. In a valve constructed with only the conventional return spring 86, a general minimum time may be 0.006 to 0.007 seconds for the field strength to fall low enough for the spring 86 to start moving the armature 68 toward the closed position. In addition, the acceleration of the armature will be low and the travel time from open to closed position will be proportionately great. However, in the valve 14 of the invention, the force of the supplementary spring means 78 produces closing movement of the armature much sooner and provides higher acceleration tending to reduce the travel time of the armature 68. It will be understood that any pressure difference across valve seats 42 and 52 will assist the valve 14 to close and it is observed that closing time are somewhat less when a large pressure difference exists. However, in adaptive braking systems, the pressure difference is not a constant value and may vary from a maximum to approximately zero, in the course of a single brake operation. For these reasons it has been found that valve operating times should be relatively independent of pressure difference. In actual practice, it has been possible to produce valves whose closing times are equal to their opening times without at the same time causing any increase in the opening time. In other words, it is possible to minimize opening times and equalize opening and closing times. Valves having these characteristics of rapid opening and closing have contributed enormously to the successful development of adaptive braking systems.

I claim:

1. In a solenoid valve:

a housing having an inlet and an outlet;

valve means movable from a first position preventing communication between the inlet and outlet to a second position permitting communication between the inlet and outlet;
a coil mounted within said housing;
a pole piece mounted within the coil;
an armature slidably mounted within said coil and movable toward said pole piece in response to energization of said coil, said armature being operably connected to said valve means and adapted to move the latter from one of said positions to the other of said positions as the armature moves toward and away from said pole piece;
a coiled spring yieldably urging said armature a predetermined distance from said pole piece to thereby establish an air gap of a predetermined length; and
second resilient means disposed in said air gap;
said second resilient means being a resilient washer having a free height less than the predetermined length of said air gap, whereby initial movement of said armature is resisted solely by said coiled spring until the armature is moved a predetermined distance, whereupon additional movement of said plunger is resisted by said coiled spring and by said resilient washer.

2. The invention of claim 1:
said resilient washer being composed of a non-magnetic material, said washer being collapsed until the latter is substantially flat when said armature is moved a predetermined distance toward said pole piece, whereby further movement of the armature toward said pole piece is prevented and the armature is separated from said pole piece a distance at least equal to the thickness of said washer.

* * * * *